(12) United States Patent
Foster (10) Patent No.: US 9,453,525 B2
(45) Date of Patent: Sep. 27, 2016

(54) ASSEMBLY WITH BLIND INSTALLATION CAPABILITY (71) Applicant: United Technologies Corporation, Hartford, CT (US)

(72) Inventor: Joseph P. Foster, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/769,344

(22) PCT Filed: Feb. 13, 2014

(86) PCT No.: PCT/US2014/016241
§ 371 (c)(1),
(2) Date: Aug. 20, 2015

(87) PCT Pub. No.: WO2014/133778
PCT Pub. Date: Sep. 4, 2014

(65) Prior Publication Data
US 2015/0377270 A1    Dec. 31, 2015

Related U.S. Application Data

(60) Provisional application No. 61/769,250, filed on Feb. 26, 2013.

(51) Int. Cl.
| | |
|---|---|
| *F16B 21/00* | (2006.01) |
| *F16B 13/08* | (2006.01) |
| *B64D 27/26* | (2006.01) |
| *F16B 5/02* | (2006.01) |
| *F01D 25/28* | (2006.01) |

(52) U.S. Cl.
CPC ............ *F16B 13/0808* (2013.01); *B64D 27/26* (2013.01); *F16B 5/02* (2013.01); *F01D 25/285* (2013.01)

(58) Field of Classification Search
CPC ...... F16B 5/02; F16B 13/0808; F16B 13/04; F16B 21/00; F02C 3/06; F02C 7/00; F01D 25/24; F01D 25/28; F01D 25/285; F04D 3/00; B64D 27/00; B64D 27/26
USPC ........................................................ 411/340
See application file for complete search history.

(56) References Cited

U.S. PATENT DOCUMENTS 1,939,983 A * 12/1933 Karitzky ............. F16B 13/0808
                                                           220/244
4,047,462 A *  9/1977 Hurtig ................ F16B 13/0808
                                                           411/346

(Continued)

OTHER PUBLICATIONS

International Search Report and Written Opinion from PCT Application Serial No. PCT/US2014/016241, Dated May 14, 2014, 9 pages.

*Primary Examiner* — Roberta Delisle
(74) *Attorney, Agent, or Firm* — Kinney & Lange, P.A.

(57) ABSTRACT

An assembly includes a pin, a fastener, a first element, and a paddle. The pin includes a first channel. The fastener extends within the pin and has a head extending from a first end of the pin. The first element is mounted to the fastener and is capable of translation relative to the pin with rotation of the fastener. The paddle is movably connected to the first element and disposed within the first channel. At least a portion of the paddle extends from the first channel to protrude from the pin with translation of the first element.

18 Claims, 10 Drawing Sheets

(56) References Cited

U.S. PATENT DOCUMENTS

| | | | | |
|---|---|---|---|---|
| 4,245,545 A | * | 1/1981 | Freeman | F16B 13/0808 |
| | | | | 411/29 |
| 4,502,826 A | | 3/1985 | Fafard | |
| 4,997,327 A | * | 3/1991 | Cira | F16B 13/0808 |
| | | | | 411/340 |
| 5,209,621 A | * | 5/1993 | Burbidge | F16B 13/0808 |
| | | | | 411/340 |
| 5,474,258 A | | 12/1995 | Taylor et al. | |
| 6,062,785 A | | 5/2000 | McDermott | |
| 6,296,203 B1 | | 10/2001 | Manteiga et al. | |
| 2012/0121390 A1 | | 5/2012 | Suciu et al. | |

* cited by examiner

ASSEMBLY WITH BLIND INSTALLATION CAPABILITY

BACKGROUND

The present disclosure relates to mounting assemblies, and more particularly to an assembly that can be used in blind installation situations.

The need for blind installation of components, including mounting hardware such as fasteners, can occur in many industries and in many applications. The need arises in the aerospace industry, as that industry places particular emphasis on the reduction of component size and weight in addition to tight clearances where a blind installation and fastening is necessary.

SUMMARY

An assembly includes a pin, a fastener, a first element, and a paddle. The pin includes a first channel. The fastener extends within the pin and has a head extending from a first end of the pin. The first element is mounted to the fastener and is capable of translation relative to the pin with rotation of the fastener. The paddle is movably connected to the first element and disposed within the first channel. At least a portion of the paddle extends from the first channel to protrude from the pin with translation of the first element.

A gas turbine engine includes a pin, a fastener, a first element, a second element, and a paddle. The pin includes a first channel. The fastener extends within the pin and has a head extending from a first end of the pin. The first element is mounted to the fastener within the pin and is capable of translation relative to the pin with rotation of the fastener. The second element is mounted to the fastener. The paddle is pivotally connected to the first element and disposed within the first channel. Translation of the first element and contact with the second element pivots the paddle to protrude from the pin.

A method includes providing a pin having a first channel, rotating a fastener to translate a first element within the pin, and pivoting a paddle relative to the first element such that the paddle tracks along the first channel to protrude at least a portion of the paddle from the pin.

DETAILED DESCRIPTION

The present disclosure describes an assembly that allows for blind installation. In particular, the assembly comprises mounting hardware including a pin, a threaded bolt, two elements such as blocks, and one or more paddles. The bolt extends through the pin and the two blocks. In one embodiment, the two blocks reside within the pin and one or both of the blocks are translated by rotation of the bolt. Translation of one or both of the blocks causes a portion of the one or more paddles to rotate outward of the pin such that the pin cannot be withdrawn or vibrate free from its mounting position. The assembly provides a simple and cost effective way to utilize a fastener within a confined or inaccessible space without the need for specially designed tools and/or a complicated assembly/disassembly process.

Figure 1:
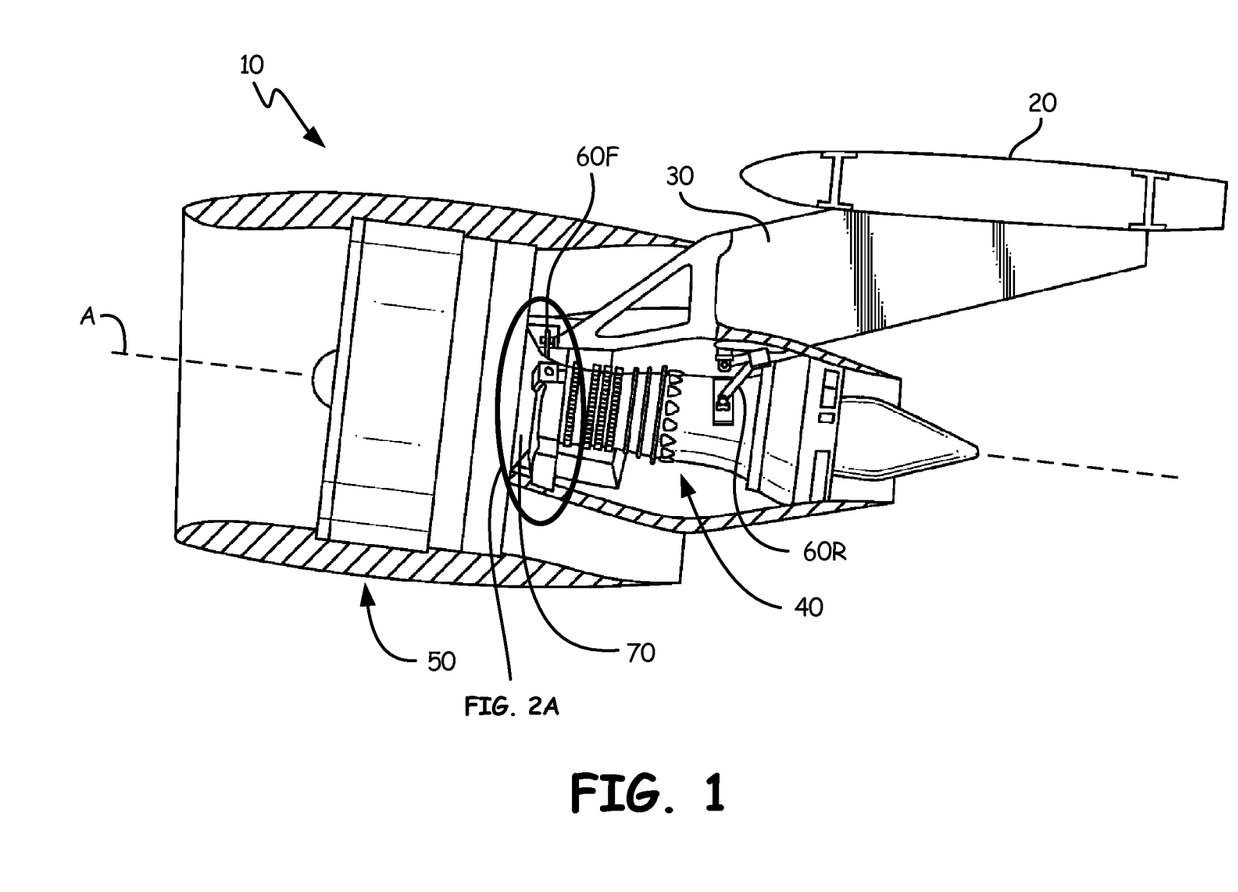
FIG. 1 is a side view of an engine mount system within a nacelle.

FIG. 1 illustrates a partial schematic view of gas turbofan engine 10 suspended from engine wing 20 by pylon 30. Engine 10 includes core 40 and nacelle 50. Forward mount 60F and rear mount 60R connect engine 10 to engine pylon 30. Core 40 is disposed within nacelle 50 and is connected to a portion of pylon 30 that is disposed under nacelle 70 via front mount 60F and rear mount 60R.

In the embodiment of FIG. 1, forward mount 60F reacts vertical loads, side loads, and axial loads. As used herein, the term "reacts" is defined as absorbing a load and dissipating the load to another location of engine 10. Forward mount 60F includes a shackle arrangement that mounts to intermediate case 70. As is further described in U.S. Pat. Nos. 8,267,349, and 8,256,707, which are incorporated herein by reference, forward mount 60F is generally a plate-like member which is oriented transverse to the plane which contains engine axis A. In some embodiments, forward mount 60F utilizes fasteners that are installed into a blind location (i.e. the fasteners are installed into a confined or inaccessible space that tooling cannot readily access) due to the proximity of forward mount 60F to a firewall of intermediate case 70. The blind installed fasteners allow forward mount 60F to engage intermediate case 70. In the embodiment illustrated in FIG. 1, provides one example of a situation that utilizes a blind installation. As discussed previously, blind installation situations can arise in many industries and in many applications. Thus, the assembly disclosed herein is applicable to many industries and many applications, and is not limited to the aerospace industry or the mounting application described herein.

Figure 2A:
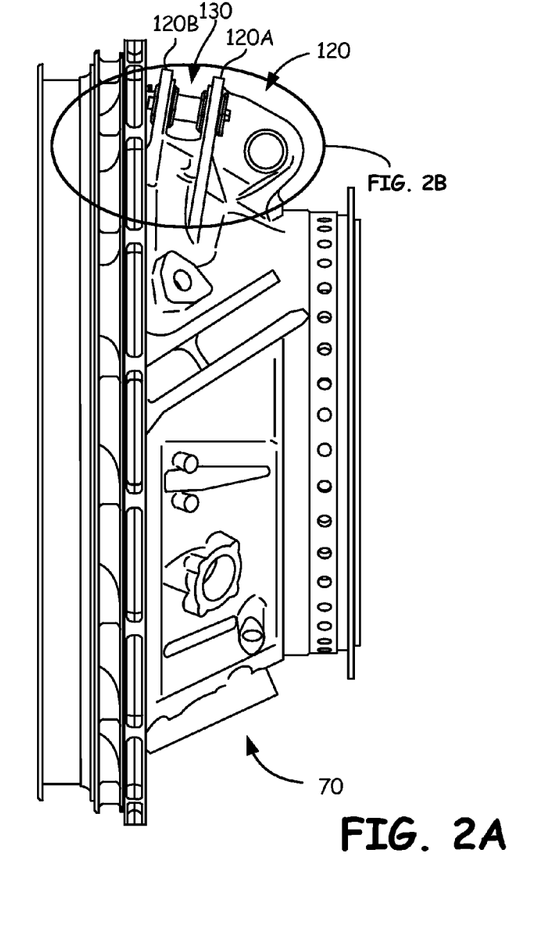
FIG. 2A is a perspective view of an intermediate case with one embodiment of an assembly.

FIG. 2A shows a perspective view of one embodiment of intermediate case 70 with forward mount 60F (FIG. 1) removed. Assembly 130 is disposed within clevis 110 and extends from lugs 120A and 120B. In operation, assembly 130 engages forward mount 60F (FIG. 1) to intermediate case 70. As shown in FIG. 2A, lug 120B is disposed closely adjacent firewall of intermediate case 70. As a result of this arrangement, the portion of assembly 130 that projects from lug 120B is not easily accessible to tooling that would ordinarily be used to engage conventional nut and bolt assemblies.

Figure 2B:
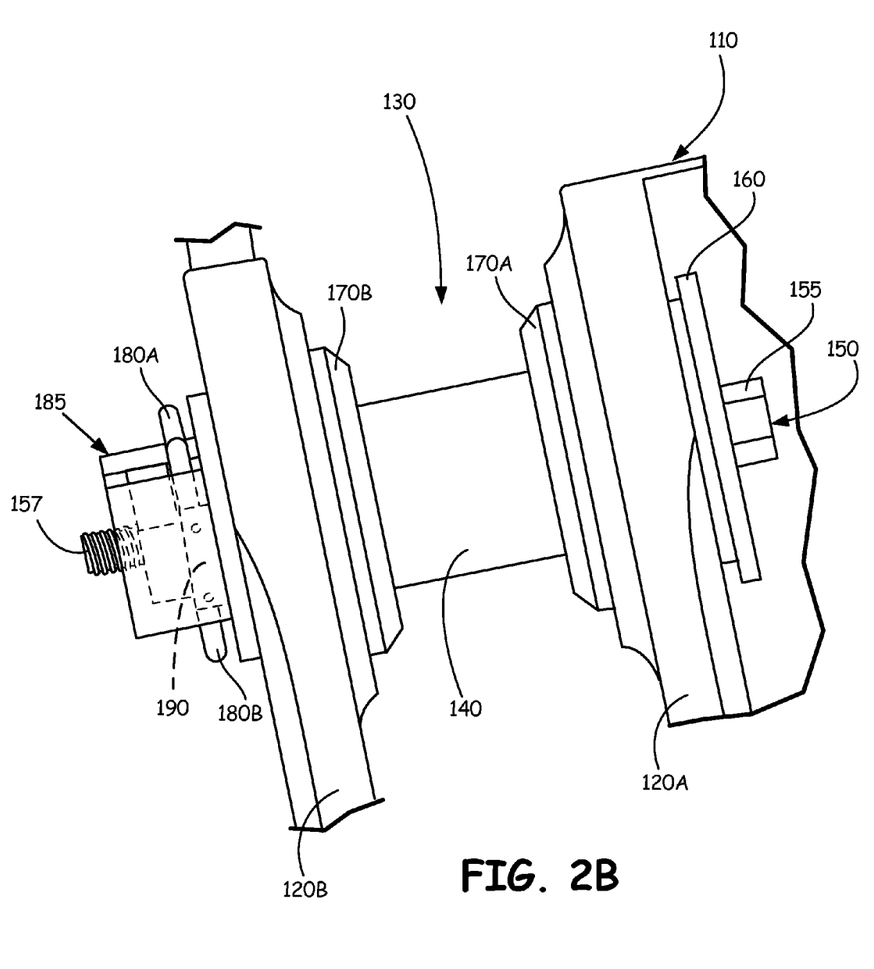
FIG. 2B is an enlarged view of the assembly of FIG. 2A mounted within a clevis of the intermediate case mounted thereto.

FIG. 2B shows an enlarged view of clevis 110 with lugs 120A and 120B. FIG. 2B additionally shows assembly 130 in further detail. Assembly 130 includes pin 140, fastener 150, washer 160, bushings 170A and 170B, paddles 180A and 180B, first channel 185, and first element 190. Fastener 150 includes head 155 and threaded portion 157.

Pin 140 extends between lug 120A and lug 120B of clevis 110. Fastener 150 extends through pin 140 and is rotatable relative thereto. In the embodiment of FIG. 2B, head 155 of fastener 150 abuts washer 160. In turn, washer 160 abuts bushing 170A. Bushing 170A is disposed within lug 120A and is adapted to receive pin 140 therein. Similarly, bushing 170B is disposed within lug 120B and is adapted to receive pin 140 therein. A distal portion of pin 140 extends from bushing 170B and lug 120B. This portion of pin 140 includes first channel 185. First channel 185 is adapted to receive paddles 180A and 180B therein. In the fully engaged position shown in FIG. 2B, a portion of paddles 180A and 180B protrude from the diameter of pin 140. First element 190, shown in phantom in FIG. 2B, is disposed within pin 140 and is mounted to fastener 150. Paddles 180A and 180B, which are shown partially in phantom, are pivotally connected to first element 190.

Once assembly 130 is inserted through bushings 170A, 170B and lugs 120A, 120B as shown in FIG. 2B, fastener 150 can be rotated relative to pin 140 to extend paddles 180A and 180B to the fully engaged position. Once in the fully engaged position, assembly 130, including pin 140, cannot be withdrawn or vibrate free from bushings 170A, 170B and lugs 120A, 120B. Assembly 130 requires torque be applied to fastener 150 only at head 155. No tooling or torque need be applied to the distal end of assembly 130 opposite head 155. Thus, assembly 130 can be used to engage with forward mount 60F (FIG. 1) in a confined or inaccessible space without the need for specially designed tools.

In the embodiment of FIG. 2B, pin 140 acts as a stationary sleeve for fastener 150 and other movable components. Fastener 150 comprises a threaded bolt with the threaded portion 157 in an unthreaded through hole in pin 140. Pin 140 is mounted in bushings 170A and 170B. Bushings 170A and 170B are press fit into lugs 120A and 120B, respectively. In the engaged position shown, paddles 180A and 180B increase the diameter of the distal end of assembly 130 such that assembly 130 cannot move past bushing 170B and lug 120B. Element 190 is mounted to threaded portion 157 of fastener 150 so as to move with rotation of fastener 150. However, in the embodiment of FIG. 2B, first element 190 is retained by pin 140 in a channel so as to translate linearly rather than rotate with the rotation of fastener 150. In one embodiment, second element 200 (FIGS. 3-4C) contacts paddles 180A and 180B and this contact applies a preload force to clevis 110. In particular, preload force is transferred through paddles 180A and 180B to bushing 170B and/or lug 120B of clevis 110. Washer 160 can additionally apply a force to bushing 170A and/or lug 120A of clevis 110.

Figure 3:
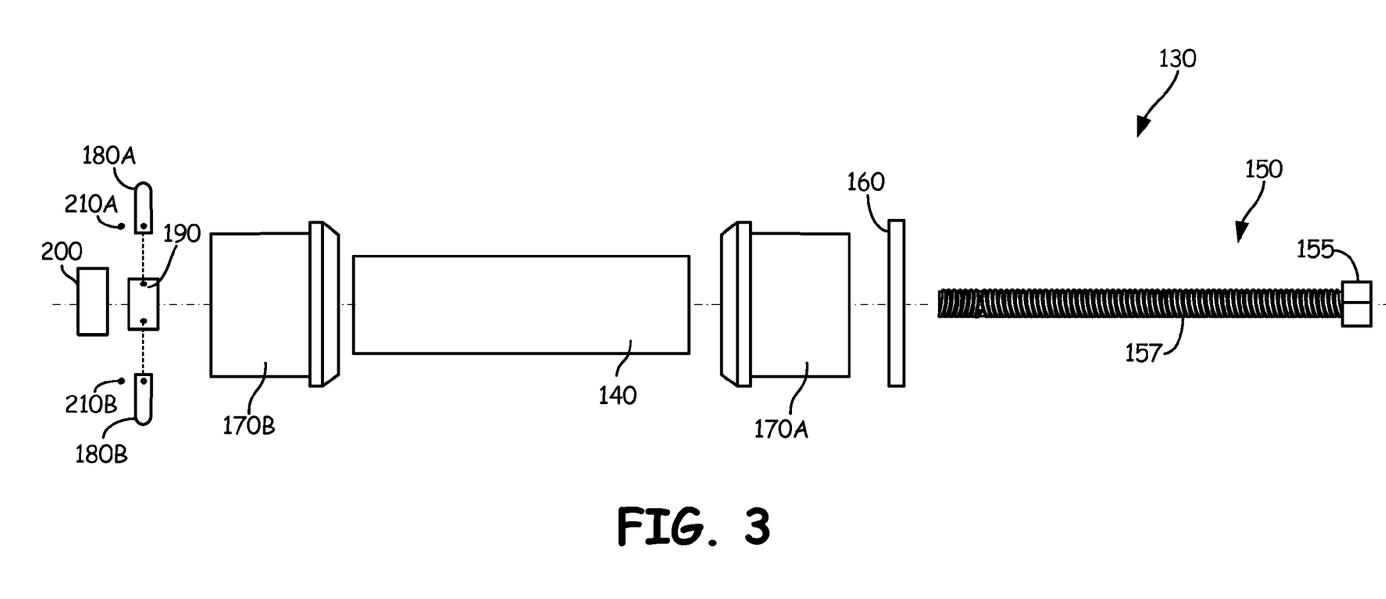
FIG. 3 is an exploded view of the assembly of FIGS. 2A and 2B.
Figure 3A:
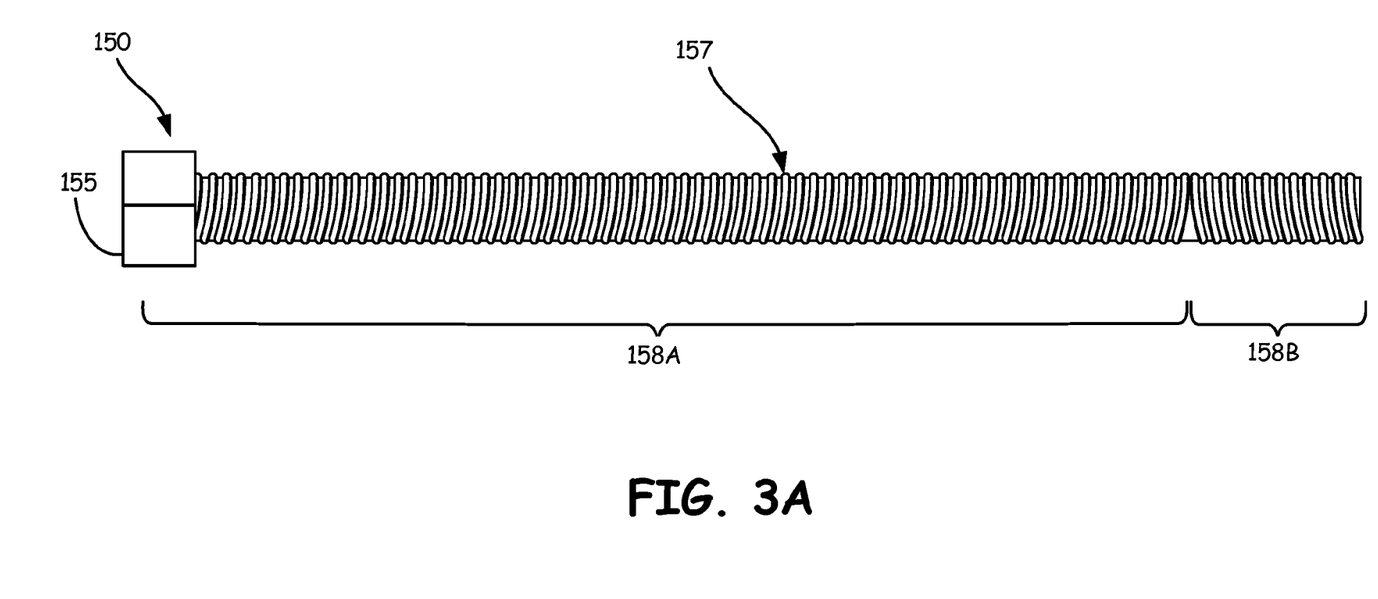
FIG. 3A is a plane view of one embodiment of a fastener used in the assembly of FIGS. 2A and 2B.

FIG. 3 shows an exploded view of assembly 130 including pin 140, fastener 150, washer 160, bushings 170A and 170B, paddles 180A and 180B, first element 190, second element 200, and pins 210A and 210B. Channel 185 (FIG. 2B) is not shown in FIG. 3. FIG. 3A shows one embodiment of fastener 150 where threaded portion 157 includes first directional thread 158A and second directional thread 158B.

As shown in FIG. 3A, first directional thread 158A extends from head 155 to second directional thread 158B. In one embodiment, first directional thread 158A comprises a clockwise thread. Second directional thread 158B extends from first directional thread 158A to the distal end of fastener 150. Second directional thread 158B is threaded in an opposing (inverse) direction to first directional thread 158A. Thus, in one embodiment where first directional thread 158A comprises a clockwise thread, second directional thread 158B comprises a counter-clockwise thread.

First element 190 (FIG. 3) has thread that complements the thread of first directional thread 158A. Second element 200 has thread that complements the thread of second directional thread 158B. Therefore, first element 190 has an inverse thread from second element 200. As a result of the thread of fastener 150, first element 190, and second element 200, first element 190 and second element 200 translate in opposing directions relative to one another. Thus, when fastener 150 is rotated in a first direction, first element 190 and second element 200 both translate toward one another. When fastener 150 is rotated in a second opposing direction to the first direction, first element 190 and second element 200 both translate away from one another.

The embodiment of fastener 150 shown in FIGS. 3 and 3A comprises only one example of fastener 150. In other embodiments, fastener 150 can have one direction of thread for the entire length of threaded portion 157 or may not have thread on one portion such as distal portion. In some embodiments, second element 200 can be eliminated from assembly 130 or second element 200 can be mounted to pin 140 so as to be stationary rather than translating with rotation of fastener 150.

FIG. 3 shows pins 210A and 210B that connect paddles 180A and 180B to first element 190. In particular, paddles 180A and 180B pivot about pins 210A and 210B to allow paddles 180A and 180B to track within channel 185 (FIGS. 2B, 4-6).

Figure 4A:
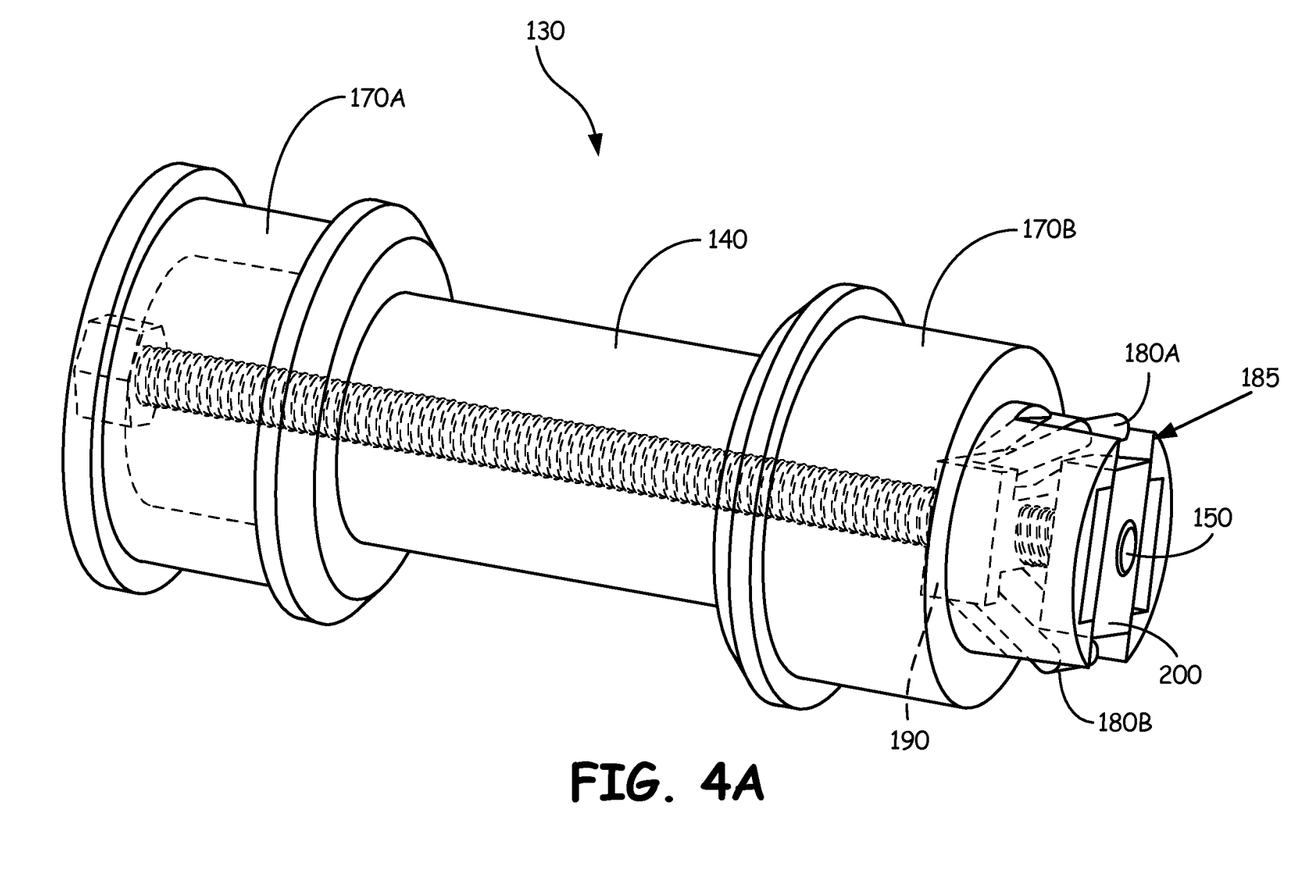
FIG. 4A is a perspective view of the assembly of FIGS. 2A and 2B with paddles in a non-deployed position.
Figure 4B:
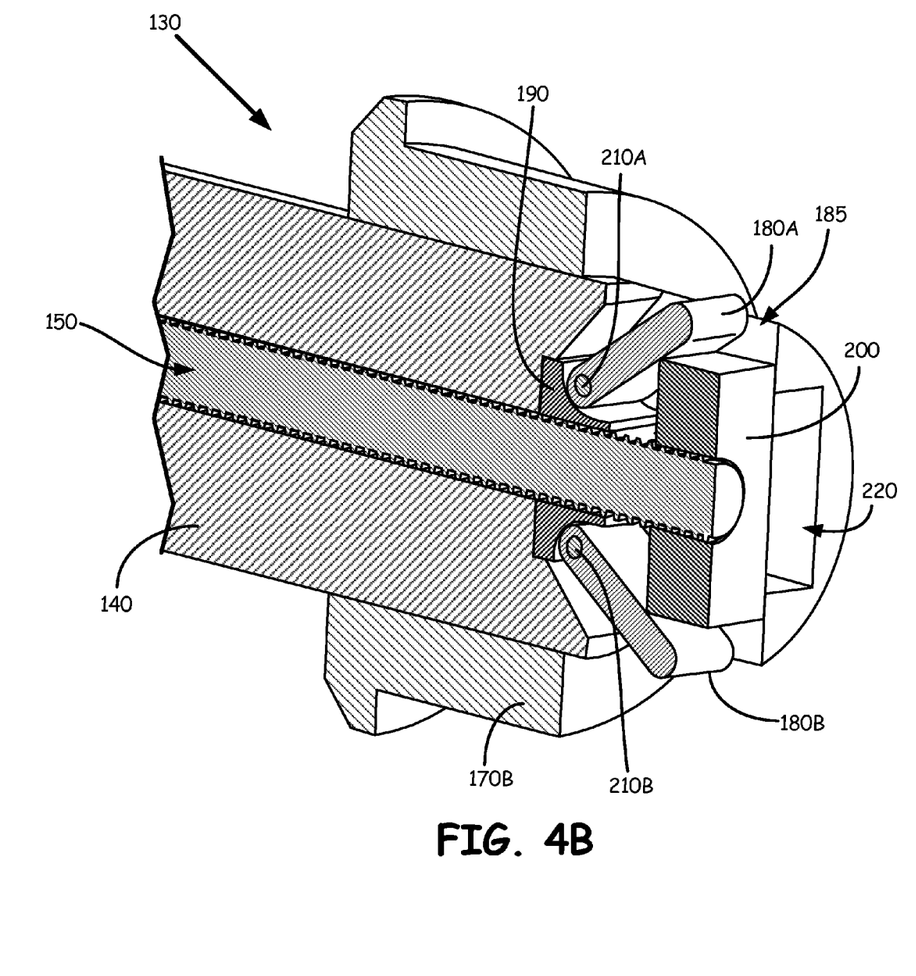
FIG. 4B is a cross-sectional view of a distal portion of the assembly of FIG. 4A.

FIGS. 4A and 4B show assembly 130 with paddles 180A and 180B in a non-fully engaged position. FIG. 4A is a perspective view of assembly 130. FIG. 4B is a cross-sectional view of a distal portion of assembly 130. In FIG. 4A, pin 140 and the remainder of assembly 130 has been inserted through bushings 170A and 170B. Paddles 180A and 180B have a small clearance to bushings 170A and 170B to allow for installation and removal. Once inserted past bushing 170A as illustrated in FIGS. 4A and 4B, paddles 180A and 180B can be deployed to track within first channel 185 into the deployed position where paddles 180A and 180B protrude past the diameter of pin 140.

As shown in FIG. 4B, paddles 180A and 180B are connected to first element 190 via pins 210A and 210B. Paddles 180A and 180B extend outward from first element 190 and are contacted by second element 200. Distal end of pin 140 includes first channel 185 and second channel 220. As previously discussed, first channel 185 receives paddles 180A and 180B and allows paddles 180A and 180B to pivot to a deployed position in which a portion of paddles 180A and 180B protrude past the diameter of pin 140. Additionally, first channel 185 is adapted to receive second element 200 therein. First channel 185 allows second element 200 to translate linearly when fastener 150 is rotated. Second channel 220 is adapted to receive first element 190 therein. Second channel 220 allows first element 190 to translate linearly when fastener 150 is rotated. Although illustrated as blocks in the FIGURES, first element 190 and second element 200 (and first channel 185 and second channel 220) can have any shape that facilitates deployment or stow of paddles 180A and 180B.

Figure 4C:
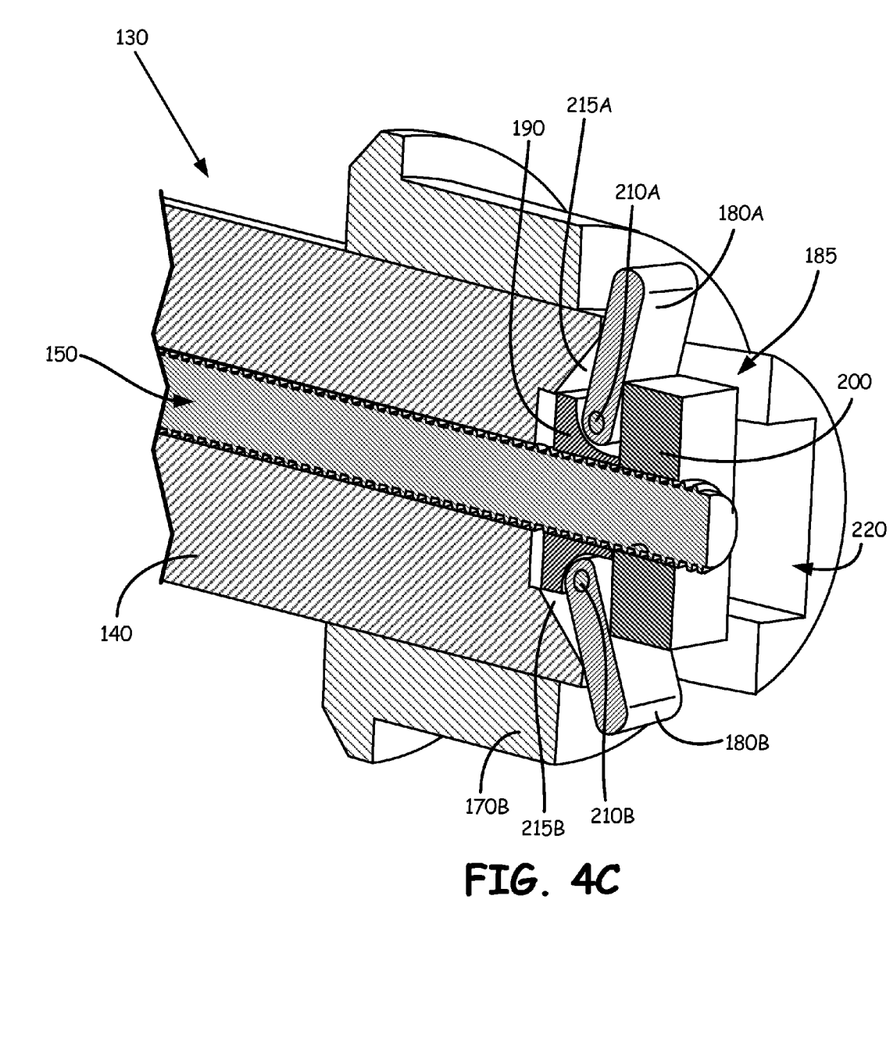
FIG. 4C is a cross-sectional view of a distal portion of the assembly with the paddles pivoted to a fully deployed position.

FIG. 4C is a cross-sectional view of a distal portion of assembly 130 with paddles 180A and 180B in a fully deployed position. As shown in FIG. 4C, fastener 150 has been rotated from the position shown in FIGS. 4A and 4B. As a result of the rotation of fastener 150, first element 190 and second element 200 have been translated toward one another. Translation of first element 190 and second element 200 (and contact between paddles 180A, 180B and second element 200) causes paddles 180A and 180B to pivot and protrude from the pin 140.

In the fully deployed position shown in FIG. 4C, first element 190 contacts second element 200. Additionally, paddles 180A and 180B contact surfaces 215A and 215B of pin 140. In other embodiments, only one or neither of the aforementioned arrangements may occur when paddles 180A and 180B are fully deployed.

Figure 5:
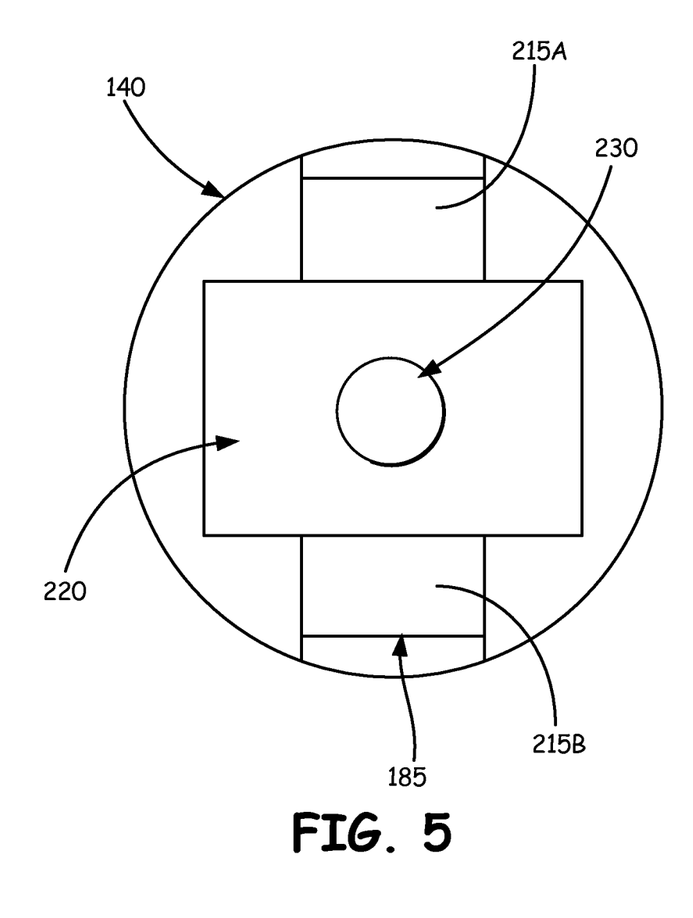
FIG. 5 is an end view of the assembly with components removed to illustrate a distal end of a pin.

FIG. 5 shows the distal end of pin 140 with fastener 150, paddles 180A, 180B, first element 190, and second element 200 removed. As shown in FIG. 5, pin 140 forms first channel 185 and second channel 220. Pin 140 is configured such that first channel 185 and second channel 220 overlap. The axial innermost portion of pin 140 that forms first channel 185 includes surfaces 215A and 215B. Through hole 230 communicates with first channel 185 and second channel 220 and extends through the remainder of pin 140.

Figure 6:
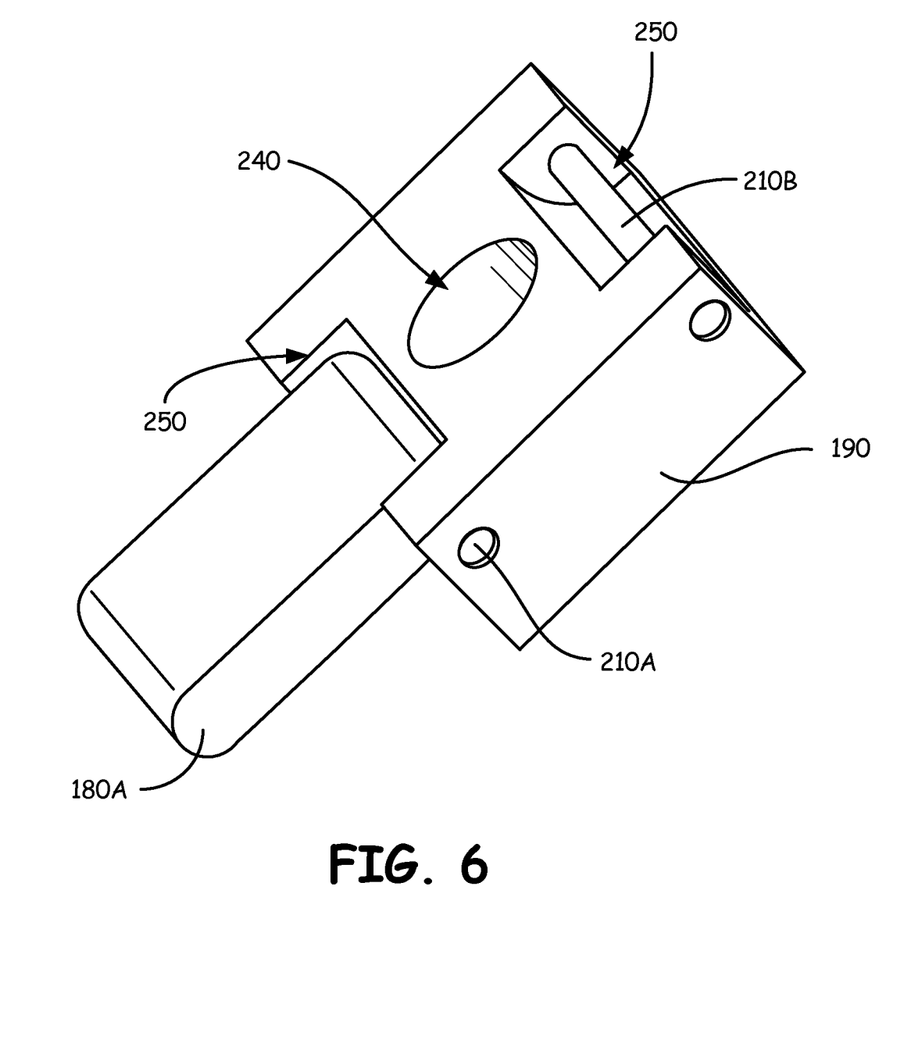
FIG. 6 is a perspective view of a first element of the assembly with a paddle pivotally connected thereto.

FIG. 6 shows a perspective view of first element 190 with paddle 180A pivotally connected thereto by pin 210A, and with paddle 180B removed. Threaded aperture 240 extends through first element 190 (the threads are now shown in FIG. 6 for simplicity). First element 190 includes recesses 250 that allow paddles 180A and 180B to mount on pins 210A and 210B and allow paddles 180A and 180B the freedom to pivot relative to first element 190. As discussed previously, although first element 190 is illustrated as a block in the FIGURES, in other embodiments first element 190 can have different shapes.

The present disclosure describes an assembly that allows for blind installation. In particular, the assembly comprises mounting hardware including a pin, a threaded bolt, two elements such as blocks, and one or more paddles. The bolt extends through the pin and the two blocks. In one embodiment, the two blocks reside within the pin and one or both of the blocks are translated by rotation of the bolt. Translation of one or both of the blocks causes a portion of the one or more paddles to rotate outward of the pin such that the pin cannot be withdrawn or vibrate free from its mounting position. The assembly provides a simple and cost effective way to utilize a fastener within a confined or inaccessible space without the need for specially designed tools and/or a complicated assembly/disassembly process.

Discussion of Possible Embodiments

The following are non-exclusive descriptions of possible embodiments of the present invention.

An assembly includes a pin, a fastener, a first element, and a paddle. The pin includes a first channel. The fastener extends within the pin and has a head extending from a first end of the pin. The first element is mounted to the fastener and is capable of translation relative to the pin with rotation of the fastener. The paddle is movably connected to the first element and disposed within the first channel. At least a portion of the paddle extends from the first channel to protrude from the pin with translation of the first element.

The assembly of the preceding paragraph can optionally include, additionally and/or alternatively, any one or more of the following features, configurations and/or additional components:

the first channel allows the paddle to pivot relative to the first element and protrude from the pin;

the pin includes a second channel that is adapted to receive the first element;

the first element is disposed within the pin;

a second element mounted to the fastener, and the second element contacts the paddle;

the second element is capable of translation relative to the pin with rotation of the fastener;

the second element translates in an opposing direction to the first element;

the fastener includes a clockwise thread for a portion mounted to the first element and a counter-clockwise thread for a second portion mounted to the second element;

the second element translates along the first channel;

the paddle reaches a fully deployed position the first element contacts the second element;

when the paddle reaches a fully deployed position the paddle contacts the pin; and the first element is capable of translation to retract the paddles retract the paddle into the first channel such that the paddle does not protrude from the pin.

A gas turbine engine includes a pin, a fastener, a first element, a second element, and a paddle. The pin includes a first channel. The fastener extends within the pin and has a head extending from a first end of the pin. The first element is mounted to the fastener within the pin and is capable of translation relative to the pin with rotation of the fastener. The second element is mounted to the fastener. The paddle is pivotally connected to the first element and disposed within the first channel. Translation of the first element and contact with the second element pivots the paddle to protrude from the pin.

The gas turbine of the preceding paragraph can optionally include, additionally and/or alternatively, any one or more of the following features, configurations and/or additional components:

the second element is capable of translation relative to the pin with rotation of the fastener;

the second element translates in an opposing direction to the first element;

the second element translates along the first channel;

when the paddle reaches a fully deployed position the first element contacts the second element; and when the paddle reaches a fully deployed position the paddle contacts the pin.

A method includes providing a pin having a first channel, rotating a fastener to translate a first element within the pin, and pivoting a paddle relative to the first element such that the paddle tracks along the first channel to protrude at least a portion of the paddle from the pin.

The method of the preceding paragraph can optionally include, additionally and/or alternatively, any one or more of the following features, configurations and/or additional components:

translating a second element mounted to the fastener and contacting the paddle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
a pin including a first channel and a second channel;
a fastener extending within the pin and having a head extending from a first end of the pin;

a first element mounted to the fastener, wherein the first element is capable of translation relative to the pin with rotation of the fastener, and wherein the second channel is adapted to receive the first element; and a paddle movably connected to the first element and disposed within the first channel, wherein at least a portion of the paddle extends from the first channel to protrude from the pin with translation of the first element.

2. The assembly of claim 1, wherein the first channel allows the paddle to pivot relative to the first element and protrude from the pin.

3. The assembly of claim 1, wherein the first element is disposed within the pin.

4. The assembly of claim 1, further comprising a second element mounted to the fastener, wherein the second element contacts the paddle.

5. The assembly of claim 4, wherein the second element is capable of translation relative to the pin with rotation of the fastener.

6. The assembly of claim 5, wherein the second element translates in an opposing direction to the first element.

7. The assembly of claim 6, wherein the fastener includes a clockwise thread for a portion mounted to the first element and a counter-clockwise thread for a second portion mounted to the second element.

8. The assembly of claim 4, wherein the second element translates along the first channel.

9. The assembly of claim 4, wherein when the paddle reaches a fully deployed position the first element contacts the second element.

10. The assembly of claim 1, wherein when the paddle reaches a fully deployed position the paddle contacts the pin.

11. The assembly of claim 1, wherein the first element is capable of translation to retract the paddle into the first channel such that the paddle does not protrude from the pin.

12. A gas turbine engine comprising:
a pin including a first channel;
a fastener extending within the pin and having a head extending from a first end of the pin;
a first element mounted to the fastener within the pin, wherein the first element is capable of translation relative to the pin with rotation of the fastener;
a second element mounted to the fastener; and
a paddle pivotally connected to the first element and disposed within the first channel, wherein translation of the first element and contact with the second element pivots the paddle to protrude from the pin.

13. The gas turbine engine of claim 12, wherein the second element is capable of translation relative to the pin with rotation of the fastener.

14. The gas turbine engine of claim 13, wherein the second element translates in an opposing direction to the first element.

15. The gas turbine engine of claim 12, wherein the second element translates along the first channel.

16. The gas turbine engine of claim 12, further comprising:
a clevis having a first lug and a second lug;
a first bushing disposed in the first lug; and
a second bushing disposed in the second lug, wherein a preload force is transferred from the second element through the paddles to one or both of the first bushing and first lug.

17. The gas turbine engine of claim 16, further comprising a washer abutting the second bushing, wherein the washer applies a force to one or both of the second bushing and second lug.

18. A method comprising:
providing a pin having a first channel;
rotating a fastener to translate a first element within the pin,
pivoting a paddle relative to the first element such that the paddle tracks along the first channel to protrude at least a portion of the paddle from the pin; and
translating a second element mounted to the fastener and contacting the paddle.

* * * * *